US011959423B2

(12) United States Patent
Brady

(10) Patent No.: US 11,959,423 B2
(45) Date of Patent: Apr. 16, 2024

(54) MODULATING FUEL FOR A TURBINE ENGINE

(71) Applicant: General Electric Company, Schenectady, NY (US)

(72) Inventor: David Justin Brady, Rockport, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/869,428

(22) Filed: Jul. 20, 2022

(65) Prior Publication Data
US 2023/0129155 A1     Apr. 27, 2023

Related U.S. Application Data

(63) Continuation of application No. 16/507,352, filed on Jul. 10, 2019, now Pat. No. 11,396,848.

(51) Int. Cl.
*F02C 9/26* (2006.01)
*F02C 7/232* (2006.01)
(Continued)

(52) U.S. Cl.
CPC .............. *F02C 9/263* (2013.01); *F02C 7/232* (2013.01); *F02C 7/236* (2013.01); *F02C 9/28* (2013.01);
(Continued)

(58) Field of Classification Search
CPC .. F02C 9/232; F02C 9/26; F02C 9/263; F02C 9/32; F02C 9/36; F02C 7/22; F02C 7/232; F05D 2270/3015
See application file for complete search history.

(56) References Cited

U.S. PATENT DOCUMENTS 3,152,444 A    10/1964  Peczkowski et al.
3,173,468 A     3/1965  McCombs, Jr.
(Continued)

FOREIGN PATENT DOCUMENTS

CN    102434289    5/2012
CN    104937241    9/2015
(Continued)

OTHER PUBLICATIONS

English Translation for EP-1146214-A2 (Year: 2001).*
(Continued)

*Primary Examiner* — Alain Chau
(74) *Attorney, Agent, or Firm* — Hanley, Flight & Zimmerman, LLC

(57) ABSTRACT

A fuel supply system for a turbine engine that provides a modulated thrust control malfunction accommodation (TCMA) is disclosed. An example fuel supply system includes a fuel supply line to supply fuel to a combustion engine, a fuel metering valve coupled to the fuel supply line, the fuel metering valve to control a flow of fuel through the fuel supply line to the combustion engine, a throttle valve coupled to the fuel supply line downstream of the fuel metering valve, the throttle valve to bleed off fuel supplied to the combustion engine based on a pressure difference across the fuel metering valve, and a controllable servo coupled to the throttle valve, the controllable servo to control the throttle valve based on a sensor output indicative of the pressure difference.

19 Claims, 5 Drawing Sheets

(51) Int. Cl.
*F02C 7/236* (2006.01)
*F02C 9/28* (2006.01)
*F02C 9/30* (2006.01)
*F02C 9/32* (2006.01)
*F02C 9/36* (2006.01)
*F02C 9/46* (2006.01)

(52) U.S. Cl.
CPC .............. *F02C 9/30* (2013.01); *F02C 9/32* (2013.01); *F02C 9/36* (2013.01); *F02C 9/46* (2013.01); *F05D 2270/09* (2013.01); *F05D 2270/3015* (2013.01); *F05D 2270/304* (2013.01)

(56) References Cited

U.S. PATENT DOCUMENTS

| | | | |
|---|---|---|---|
| 3,358,922 | A | 12/1967 | Norton |
| 4,578,945 | A | 4/1986 | Peck et al. |
| 4,602,479 | A | 7/1986 | Hansen |
| 4,716,723 | A | 1/1988 | Ralston et al. |
| 5,518,025 | A * | 5/1996 | Futa, Jr. .................. F02C 9/263 137/488 |
| 5,896,737 | A * | 4/1999 | Dyer ........................ F02C 7/22 60/773 |
| 5,927,064 | A | 7/1999 | Dyer et al. |
| 6,148,601 | A | 11/2000 | Jones et al. |
| 6,189,312 | B1 * | 2/2001 | Smith ...................... F02C 9/263 137/110 |
| 6,272,843 | B1 | 8/2001 | Schwamm |
| 6,321,527 | B1 * | 11/2001 | Dyer ........................ F02C 9/263 60/39.281 |
| 6,381,946 | B1 | 5/2002 | Wernberg et al. |
| 6,584,762 | B2 | 7/2003 | Snow et al. |
| 6,655,151 | B2 | 12/2003 | Mahoney et al. |
| 6,751,942 | B2 | 6/2004 | Mahoney et al. |
| 6,971,373 | B2 | 12/2005 | Mudway et al. |
| 6,981,359 | B2 | 1/2006 | Wernberg et al. |
| 6,996,969 | B2 | 2/2006 | Dalton |
| 7,096,658 | B2 | 8/2006 | Wernberg et al. |
| 7,100,355 | B2 | 9/2006 | Wieger et al. |
| 7,234,293 | B2 * | 6/2007 | Yates ...................... F02C 7/236 60/734 |
| 7,878,003 | B1 * | 2/2011 | Smith ...................... F02C 7/224 60/764 |
| 8,162,287 | B2 | 4/2012 | Overman et al. |
| 8,434,310 | B2 | 5/2013 | Baxter et al. |
| 8,825,342 | B2 | 9/2014 | Schaeffer et al. |
| 9,234,465 | B2 * | 1/2016 | Futa ......................... F02C 9/34 |
| 9,334,840 | B2 | 5/2016 | Baker |
| 9,476,358 | B2 | 10/2016 | Baker et al. |
| 9,964,046 | B2 * | 5/2018 | Oba ...................... F04D 15/0066 |
| 10,041,497 | B2 * | 8/2018 | Nyzen .................... F02C 7/236 |
| 10,082,444 | B2 | 9/2018 | Veyrat-Masson et al. |
| 10,267,237 | B2 | 4/2019 | Pool et al. |
| 10,428,742 | B2 * | 10/2019 | van Alen ................ F02C 9/32 |
| 10,428,744 | B2 | 10/2019 | Veilleux |
| 10,450,961 | B2 * | 10/2019 | Marocchini ............. F02C 7/232 |
| 10,502,138 | B2 * | 12/2019 | Reuter .................... F02C 9/263 |
| 10,563,589 | B2 | 2/2020 | Morton |
| 10,711,704 | B2 * | 7/2020 | Chapski .................. F02C 7/262 |
| 10,900,421 | B2 | 1/2021 | Hahn |
| 11,396,848 | B2 | 7/2022 | Brady |
| 2003/0046937 | A1 | 3/2003 | Mahoney et al. |
| 2003/0074884 | A1 * | 4/2003 | Snow ...................... F02C 9/48 60/764 |
| 2003/0192300 | A1 | 10/2003 | Mahoney et al. |
| 2005/0066648 | A1 | 3/2005 | Dalton |
| 2005/0166573 | A1 * | 8/2005 | Hommema ............. F02C 9/263 60/703 |
| 2005/0217236 | A1 | 10/2005 | Wernberg et al. |
| 2005/0223690 | A1 * | 10/2005 | Wernberg ............... F02C 7/236 60/734 |
| 2005/0262824 | A1 * | 12/2005 | Yates ...................... F02C 7/232 60/39.281 |
| 2005/0279079 | A1 * | 12/2005 | Baryshnikov ........... F02C 7/232 60/39.094 |
| 2005/0284148 | A1 * | 12/2005 | Wernberg ............... F02C 9/30 60/734 |
| 2012/0156061 | A1 * | 6/2012 | Baker ..................... F02C 7/236 417/288 |
| 2012/0261000 | A1 * | 10/2012 | Futa ........................ F02C 7/232 137/101 |
| 2013/0276918 | A1 | 10/2013 | Augsjaahabink |
| 2014/0033520 | A1 | 2/2014 | Nakagishi |
| 2015/0020888 | A1 | 1/2015 | Baker et al. |
| 2015/0020889 | A1 | 1/2015 | Baker |
| 2015/0027412 | A1 | 1/2015 | Henson |
| 2015/0125313 | A1 * | 5/2015 | Nyzen .................... F04B 23/14 417/253 |
| 2016/0053689 | A1 | 2/2016 | Morton |
| 2016/0186670 | A1 * | 6/2016 | Oba ........................ F02C 9/263 417/15 |
| 2016/0245524 | A1 | 8/2016 | Hill |
| 2016/0265444 | A1 | 9/2016 | Pool et al. |
| 2016/0305338 | A1 * | 10/2016 | Chapski .................. F02C 9/46 |
| 2017/0167390 | A1 * | 6/2017 | Haugsjaahabink .... B64D 37/00 |
| 2017/0292451 | A1 * | 10/2017 | Reuter .................... F02C 7/22 |
| 2017/0321608 | A1 * | 11/2017 | Crowley ................. F02C 7/222 |
| 2017/0350323 | A1 * | 12/2017 | van Alen ................ F02C 9/263 |
| 2017/0363008 | A1 * | 12/2017 | Marocchini ............. F02C 7/232 |
| 2018/0045122 | A1 | 2/2018 | Veilleux |
| 2018/0066591 | A1 | 3/2018 | Ozzello et al. |
| 2020/0123986 | A1 | 4/2020 | Hahn |
| 2021/0010429 | A1 | 1/2021 | Brady |

FOREIGN PATENT DOCUMENTS

| | | | | |
|---|---|---|---|---|
| CN | 109312665 | | 2/2019 | |
| EP | 1146214 | A2 * | 10/2001 | ............... F02C 9/26 |
| EP | 2511499 | | 10/2012 | |

OTHER PUBLICATIONS

United Kingdom Intellectual Property Office, "Examination Report," issued in connection with United Kingdom Patent Application No. GB2008849.8, dated Apr. 4, 2022, 5 pages.

United Kingdom Intellectual Property Office, "Combined Search and Examination Report under Sections 17 and 18(3)" issued in connection with United Kingdom Patent Application No. GB2008849.8, dated Nov. 20, 2020, 7 pages.

United Kingdom Intellectual Property Office, "Examination Report," issued in connection with United Kingdom Patent Application No. GB2008849.8, dated Dec. 2, 2021, 4 pages.

United States Patent and Trademark Office, "Restriction Requirement," issued in connection with U.S. Appl. No. 16/507,352, dated Jun. 3, 2021, 7 pages.

United States Patent and Trademark Office, "Non-Final Office Action, " issued in connection with U.S. Appl. No. 16/507,352, dated Aug. 30, 2021, 13 pages.

United States Patent and Trademark Office, "Notice of Allowance," issued in connection with U.S. Appl. No. 16/507,352, dated Jun. 13, 2022, 11 pages.

United Kingdom Intellectual Property Office, "Combined Search and Examination Report," issued in connection with United Kingdom Patent Application No. GB2212190.9, dated Feb. 13, 2023, 5 pages.

United States Patent and Trademark Office, "Notice of Allowance and Fee(s) Due," issued in connection with U.S. Appl. No. 16/507,352, filed Mar. 23, 2022, 14 pages.

United Kingdom Intellectual Property Office, "Combined Search and Examination Report Under Sections 17 and 18(3)," issued in connection with UK Patent Application No. GB2315213.5, dated Oct. 10, 2023, 5 pages.

The State Intellectual Property Office of People's Republic of China, "Search Report," issued in connection with Chinese Application No. 202010662599.0 dated Nov. 16, 2022, 2 pages.

* cited by examiner

MODULATING FUEL FOR A TURBINE ENGINE

RELATED APPLICATION

This patent arises from a continuation of U.S. patent application Ser. No. 16/507,352, (now U.S. Pat. No. 11,396,848) which was filed on Jul. 10, 2019. U.S. patent application Ser. No. 16/507,352 is hereby incorporated herein by reference in its entirety. Priority to U.S. patent application Ser. No. 16/507,352 is hereby claimed.

TECHNICAL FIELD

This invention relates generally to turbine engine with a thrust control malfunction accommodation (TCMA) and more particularly to the modulation of the TCMA using valves controlled by pressure sensing.

BACKGROUND

Turbine engines, and particularly gas or combustion turbine engines, are rotary engines that extract energy from a flow of combusted gases passing through the engine onto a multitude of rotating turbine blades.

A turbine engine includes but is not limited to, in serial flow arrangement, a forward fan assembly, an aft fan assembly, a high-pressure compressor for compressing air flowing through the engine, a combustor for mixing fuel with the compressed air such that the mixture may be ignited, and a high-pressure turbine. The high-pressure compressor, combustor and high-pressure turbine are sometimes collectively referred to as the core engine.

Traditionally, turbine engines include a fuel supply system to transfer fuel from a fuel tank to the combustor. A thrust control malfunction accommodation (TCMA) decreases or eliminates the flow of fuel to the combustor when certain conditions are detected in the fuel supply system that indicate a malfunction that can be a valve failure.

BRIEF DESCRIPTION

In one aspect, the present disclosure relates to a fuel supply system for a turbine engine comprising a rotor, the fuel supply system that includes a fuel tank, a fuel line fluidly coupling the fuel tank to the turbine engine, a fuel pump fluidly coupled to the fuel line and driven by the rotor to pump fuel through the fuel line from the fuel tank to the turbine engine, a bypass line fluidly coupling the fuel line, downstream of the fuel pump, to at least one of the fuel pump, the fuel tank, or the fuel line, upstream of the fuel pump, a fuel metering valve fluidly coupled to the fuel line downstream of the fuel pump, a bypass valve fluidly coupling the fuel line to the bypass line upstream of the fuel metering valve, and a balancing pressure valve fluidly coupling the bypass line downstream of the bypass valve to at least one of the fuel pump, the fuel tank, the fuel line upstream of the fuel pump, or the bypass line upstream of the bypass valve, and maintains the pressure differential across the bypass valve at a predetermined bypass pressure differential.

In another aspect, the present disclosure relates to a fuel supply system for supplying fuel from a fuel tank to a combustion engine with a rotor, the fuel supply system that includes a fuel supply line supplying fuel from the fuel tank to the combustion engine, a fuel pump pumping fuel through the fuel supply line, a fuel metering valve controlling the flow of fuel through the fuel supply line to the combustion engine, a bleed valve assembly bleeding off fuel supplied to the engine based on the pressure difference across the fuel metering valve.

In yet another aspect, the present disclosure relates to a method for controlling the supply of fuel from a fuel tank to a turbine engine having a rotor, the method including pumping fuel from the fuel tank to the turbine engine at a first rate that is a function of a rotational speed of the rotor, metering the pumped fuel being supplied to the engine at a second rate that is a function of a throttle setting of the turbine engine, after the metering, redirecting unused pumped fuel, and controlling the amount of redirected unused fuel based on predetermined pressure differential between the pumped fuel and the metered fuel.

DETAILED DESCRIPTION

Figure 1:
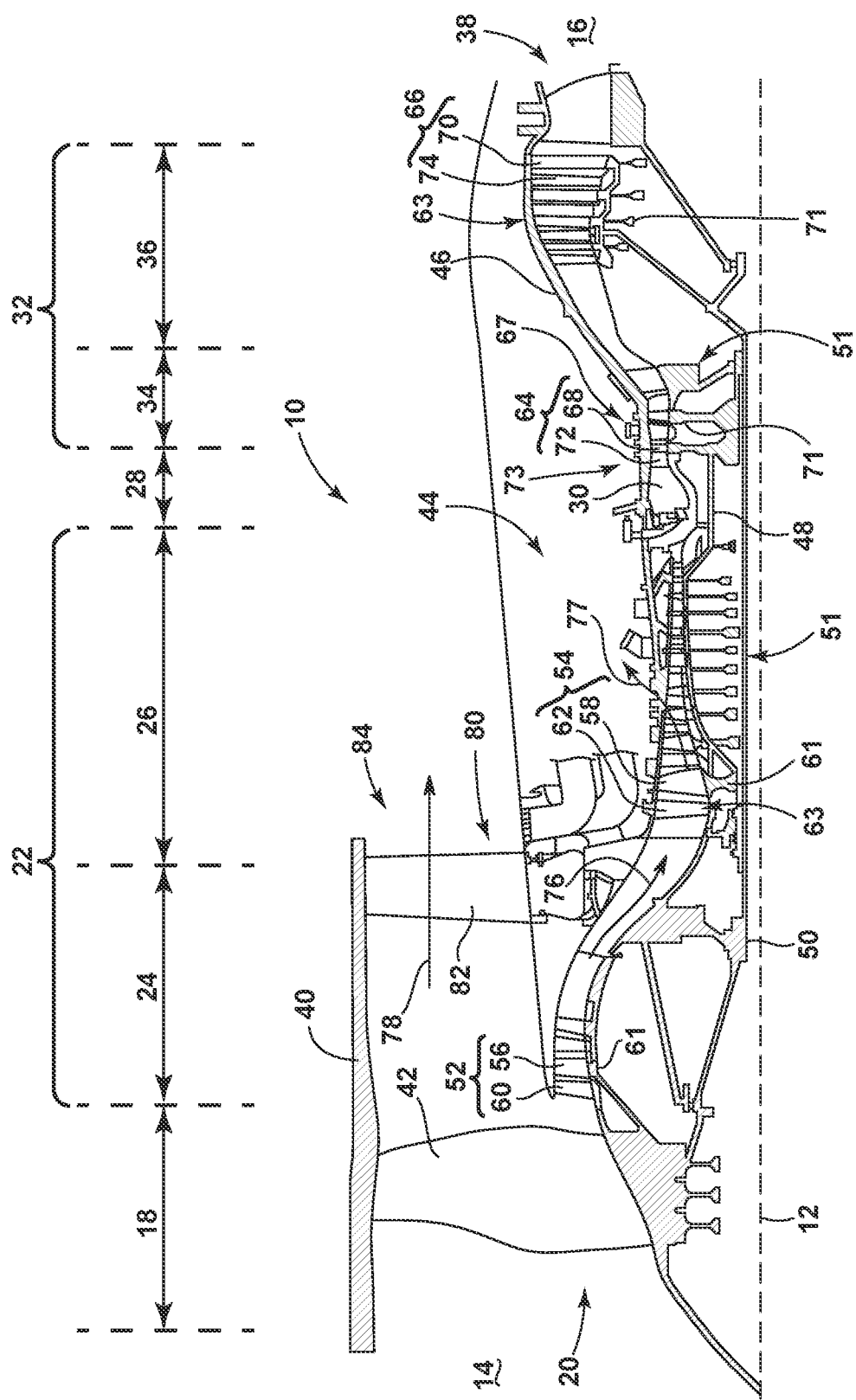
FIG. 1 is a schematic, sectional view of a gas turbine engine.

Aspects of the disclosure relate to a fuel supply system that provides a modulated thrust control malfunction accommodation (TCMA). For the purposes of description, the fuel supply system will be described in the context of an aircraft turbine engine. It will be further understood that aspects of the disclosure described herein are not so limited and may have general applicability in non-aircraft applications, such as other mobile applications and non-mobile industrial, commercial, and residential applications.

The figures referred to above are not necessarily drawn to scale, should be understood to provide a representation of particular aspects of the disclosure, and are merely conceptual in nature and illustrative of the principles involved. Some features depicted in the drawings may have been enlarged or distorted relative to others to facilitate explanation and understanding.

As used herein, the term "forward" refers to moving in a direction toward the engine inlet, or a component being relatively closer to the engine inlet as compared to another component. The term "aft" used in conjunction with "forward" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

As used herein, the term "downstream" refers to a direction or position that is in the same direction as the flow of a liquid. The term "upstream" used in conjunction with "downstream" refers to a direction or position that is in the opposite direction as the flow of a liquid.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine 10 for an aircraft. The engine 10 has a centerline or longitudinal axis 12 extending forward 14 to aft 16. The engine 10 includes, in downstream or aft serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the longitudinal axis 12. The HP compressor 26, the combustor 30, and the HP turbine 34 form an engine core 44, which generates combustion gases. The engine core 44 is surrounded by core casing 46, which can be coupled with the fan casing 40.

A HP shaft or spool 48 disposed coaxially about the longitudinal axis 12 of the engine 10 drivingly connects the HP turbine 34 to the HP compressor 26. A LP shaft or spool 50, which is disposed coaxially about the longitudinal axis 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define an inner rotor/stator 51. While illustrated as a rotor, it is contemplated that the inner rotor/stator 51 can be a stator.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the longitudinal axis 12, from a blade platform to a blade tip, while the corresponding static compressor vanes 60, 62 are positioned forward of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the longitudinal axis 12, from a blade platform to a blade tip, while the corresponding static turbine vanes 72, 74 are positioned forward of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as an outer rotor/stator stator 63. As illustrated, the outer rotor/stator 63 can refer to the combination of non-rotating elements throughout the engine 10. Alternatively, the outer rotor/stator 63 that circumscribes at least a portion of the inner rotor/stator 51, can be designed to rotate.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and the engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly aft of the combustion section 28. Other sources of cooling fluid can be, but are not limited to, fluid discharged from the LP compressor 24 or the HP compressor 26.

Figure 2:
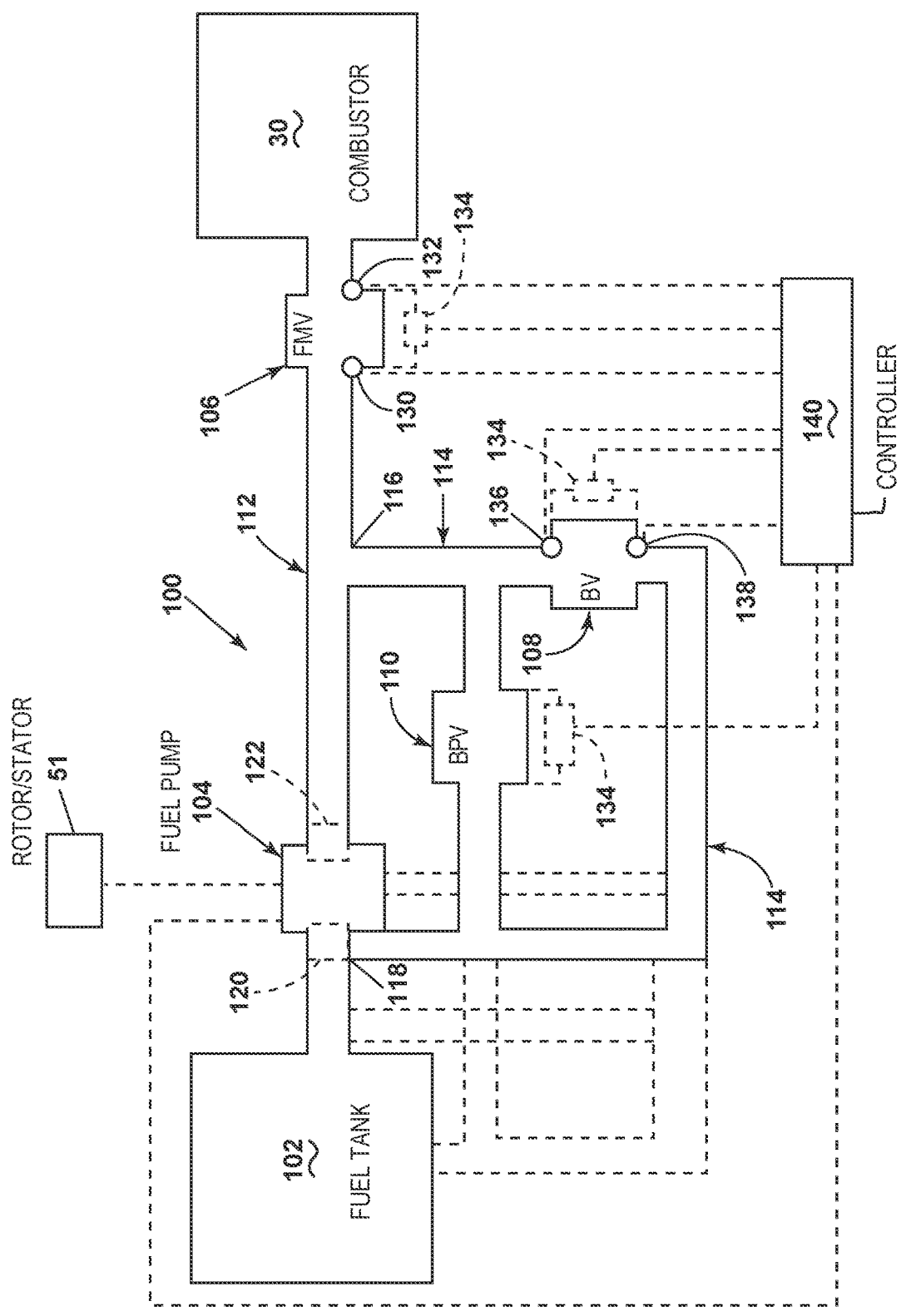
FIG. 2 is a schematic illustration of a fuel supply system for the gas turbine of FIG. 1.

FIG. 2 schematically illustrates a fuel supply system 100 for supplying fuel to the combustor 30 of the engine 10. While illustrated as fluidly connected to the combustor 30, it is contemplated that the fuel supply system 100 can be fluidly connected to other components of the engine 10. The fuel supply system 100 includes at least a fuel tank 102, a fuel pump 104, a fuel metering valve (FMV) 106, a bypass valve (BV) 108, and a balancing pressure valve (BPV) 110.

A fuel supply line or fuel line 112 fluidly connects the fuel tank 102 to the combustor 30. The fuel pump 104 is fluidly coupled to the fuel line 112 to pump fuel from the fuel tank 102, through the fuel line 112, and to the combustor 30 of the engine 10. The FMV 106 is fluidly connected to the fuel line 112 downstream of the fuel pump 104 and upstream of the combustor 30. The FMV 106 can control the amount of fuel suppled to the combustor 30.

A bypass line 114 has a first end 116 that couples to the fuel line 112 downstream of the fuel pump 104 and upstream of the FMV 106. However, it is contemplated that the bypass line 114 can be connected to the fuel line 112 downstream of the FMV 106 and upstream of the combustor 30. A second end 118 of the bypass line 114 can couple to an inlet 120 of the fuel pump 104, fluidly connecting the fuel line 112 downstream of an outlet 122 of the fuel pump 104 to the inlet 120 of the fuel pump 104. The BV 108 is fluidly coupled to the bypass line 114 between the first and second ends 116, 118. The BV 108 can control the flow of fuel from the fuel line 112 through the bypass line 114, which in turn effects the pressure difference across the FMV 106. Alternatively, the second end 118 of the bypass line 114 can fluidly connect the fuel line 112 downstream of the fuel pump 104 to a stage of the fuel pump 104, a portion of the fuel line 112 upstream of the fuel pump 104, or the fuel tank 102.

The BPV 110 fluidly couples the bypass line 114 upstream of the BV 108 to the inlet 120 of the fuel pump 104. The BPV 110 can be used to adjust the pressure difference across the BV 108. Alternatively, the BPV 110 fluidly couples the bypass line 114 upstream of the BV 108 to a stage of the fuel pump 104, a portion of the fuel line 112 upstream of the fuel pump 104, or the fuel tank 102.

The fuel pump 104 can be in communication with the rotor 51. That is, the rotor 51 can mechanically or electrically drive or stroke the fuel pump 104. Alternatively, the fuel pump 104 can be in communication with the outer rotor/stator 63, when the outer rotor/stator 63 is configured to rotate. The fuel pump 104 can be, by way of non-limiting example, a positive displacement pump.

The FMV 106 can include at least one pressure sensor, illustrated, by way of non-limiting example, as an upstream pressure sensor 130 and a downstream pressure sensor 132. The upstream and downstream pressure sensors 130, 132 can provide output signals indicative of the pressure drop across the FMV 106. The pressure drop across the FMV 106 can provide a fuel line pressure differential.

Optionally, the FMV 106 can include a controllable servo 134. The controllable servo 134 can be used to position or control the FMV 106. It is contemplated that the controllable servo 134 can be part of an electrohydraulic servo valve.

Similarly, the BV 108 can include at least one pressure sensor, illustrated, by way of non-limiting example, as a first pressure sensor 136 upstream of the BV 108 and a second pressure sensor 138 downstream of the BV 108. The first and second pressure sensors 136, 138 can provide output signals indicative of the pressure drop across the BV 108. The pressure drop across the BV 108 can provide a bypass pressure differential.

Optionally, the BV 108 or the BPV 110 can include the controllable servo 134. The controllable servo 134 can be used to position or control the BV 108 or the BPV 110. It is contemplated that the controllable servo 134 in the BV 108 or the BPV 110 can be similar to or manufactured differently than the controllable servo 134 in the FMV 106. It is contemplated that the BV 108 can be a bleed valve.

A controller 140 can communicatively couple to the upstream and downstream pressure sensors 130, 132, receiving signals that can be used to calculate the fuel line pressure differential across the FMV 106. The controller 140 can also communicatively couple to the first and second pressure sensors 136, 138, receiving signals that can be used to calculate the bypass pressure differential across the BV 108.

The controllable servo(s) 134 can be in communication with the controller 140. The FMV 106, BV 108, or BPV 110 can be adjusted, positioned, or otherwise altered by a signal from the controller 140 indicating a setting/position for the controllable servo(s) 134.

While only a single controller 140 has been illustrated, it is contemplated that any number of controllers 140 can be included. The controller 140 can include or be associated with any suitable number of individual microprocessors, power supplies, storage devices, interface cards, auto flight systems, flight management computers or systems, TCMA, and other standard components. The controller 140 can be communicably coupled to one or more communication links to transmit data to and from the engine 10 or components of the fuel supply system 100. It is contemplated that the communication links can be wireless communication links and can be any variety of communication mechanism capable of wirelessly linking with other systems and devices and can include, but is not limited to, packet radio, satellite uplink and/or downlink, Wireless Fidelity (WiFi), WiMax, Bluetooth, ZigBee, 3G wireless signal, code division multiple access (CDMA) wireless signal, global system for mobile communication (GSM), 4G wireless signal, 5G wireless signal, long term evolution (LTE) signal, Ethernet, or any combinations thereof. It will also be understood that the particular type or mode of wireless communication is not critical to aspects of the present disclosure, and later-developed wireless networks are certainly contemplated as within the scope of the present disclosure.

Figure 3:
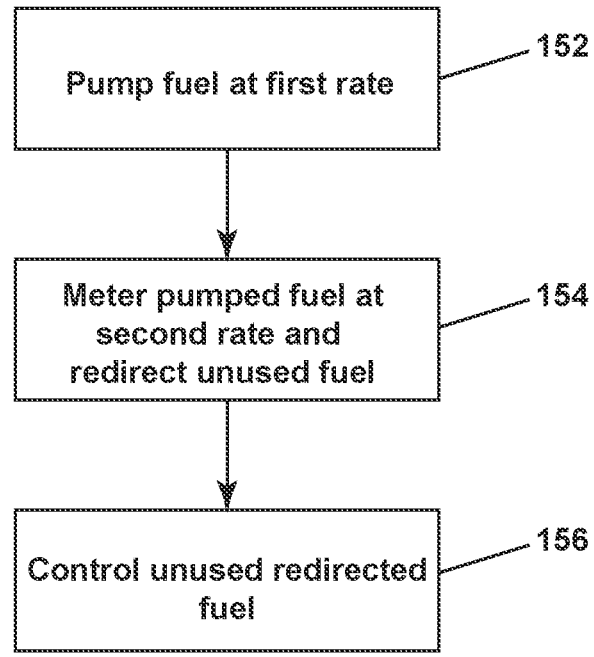
FIG. 3 is a flow chart diagram illustrating a method for that can be carried out at least in part by the fuel supply system of FIG. 2.

FIG. 3 illustrates a method 150 for controlling the supply of fuel from the fuel tank 102 to the turbine engine 10. In 152, fuel is pumped at a first rate from the fuel tank 102 by the fuel pump 104. The first rate can be a function of the rotational speed of the rotor 51, 63 communicated to the fuel pump 104 through a mechanical, electrical, magnetic, or other means of communication. By way of non-limiting example, the fuel pump 104 can include one or more pumps that can be driven by a shaft from an accessory gear box that is mechanically coupled to the rotor 51, 63. Additionally, or alternatively, the fuel pump 104 can be driven by an electric motor that is provided electric power from either the aircraft or the engine.

It is contemplated that the fuel pump 104 can include any number of pumps, structures, or devices in any location for drawing fuel from at least one fuel tank. By way of non-limiting example, the fuel pump 104 can include one or more pumps located within the fuel tank 102 fluidly connected to a pump exterior of the fuel tank 102 or the fuel line 112. Another non-limiting example of the fuel pump 104 can include a pump exterior of the fuel tank 102 fluidly connected to the fuel line 112.

Next, in 154, the fuel is metered to flow at a second rate. The fuel can be metered by the FMV 106 to flow at the second rate, where the second rate is a function of a throttle setting of the turbine engine 10. The throttle setting can be communicated to the FMV 106 using any known methods of communication including, but not limited to, the controller 140. It is contemplated that the second rate is less than the first rate. The unused pumped fuel from the first rate that is metered out to the second rate can be redirected via the bypass line 114.

Figure 4:
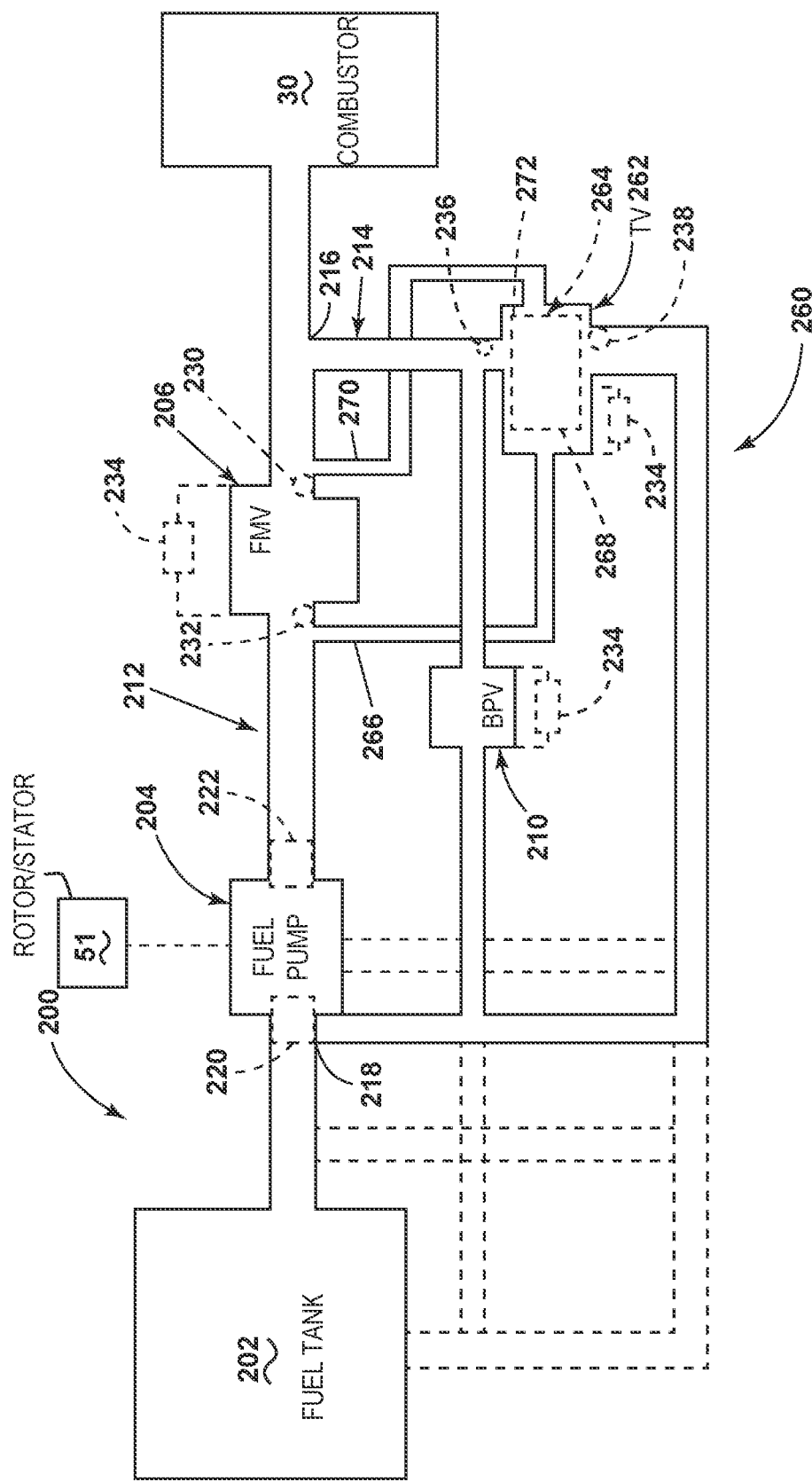
FIG. 4 is a variation of the fuel supply system of FIG. 2.

The amount of redirected unused fuel can be controlled in 156 based on a predetermined pressure differential between the pumped fuel and the metered fuel. The predetermined pressure differential can be an operationally expected pressure differential for the throttle setting. Further control of the unused pumped fuel can depend on a predetermined pressure differential across the BV 108 or a throttle valve (as illustrated in FIG. 4).

In operation, the fuel pump 104 pumps fuel from the fuel tank 102 at the first rate determined, at least in part, by the rotation of the rotor 51. The pumped fuel flows through a fuel line 112 to the FMV 106. The FMV 106 then allows fuel to flow to the combustor 30 of the engine 10 at the second rate. The second rate can be determined by a throttle setting communicated to the FMV 106 using the controller 140. The controller 140 or the signal received by the FMV 106 can activate the controllable servo 134 to set the valve at the proper position to obtain the desired fuel line pressure differential. The fuel line pressure differential can be an absolute value or a value determined by a throttle setting. Absolute valve being within 5% of a predetermined number.

The fuel line pressure differential can be measured by the FMV 106 or the controller 140 using the upstream and downstream pressure sensors 130, 132. Unused pumped fuel is removed, bleed, or otherwise redirected from the fuel line 112 to obtain the second flow rate and predetermined fuel line pressure differential. The unused pumped fuel can flow through the bypass line 114 and the BV 108 back to the fuel pump 104, the fuel tank 102, or the fuel line 112 upstream of the fuel pump 104.

The BPV 110 can be used to maintain the predetermined bypass pressure differential across the BV 108. The predetermined bypass pressure differential can be determined by the throttle setting, the fuel line pressure differential, or an absolute value. The first and second pressure sensors 136, 138 on the upstream and downstream sides of the BV 108 can provide a control signal that is communicated to the controllable servo 134 of the BPV 110. The BPV maintains the predetermined bypass pressure differential by allowing fuel to flow through the BPV 110 and return to the inlet 120 of the fuel pump 104, the fuel tank 102, a stage of the fuel pump 104, or the fuel line 112 upstream of the fuel pump 104.

Traditionally, if the FMV 106 fails, the TCMA cuts fuel or drastically reduces the flow of fuel to the combustor 30 by sending a signal to the fuel pump 104. However, the fuel supply system 100 has the ability to control the bypass pressure differential. The control of the bypass pressure differential allows the TCMA to modulate the fuel flow using the BV 108 and BPV 110 in a situation in which the FMV 106 is stuck open or otherwise malfunctioning. The fuel supply system 100 can then provide, in a controlled manned, the required fuel for the engine 10 to obtain the fuel it needs to maintain proper function even in the event that the FMV 106 has malfunctioned. This can be accomplished using the BPV 110 to control of the bypass pressure differential measured across the BV 108.

FIG. 4 illustrates a fuel supply system 200 that is substantially similar to the fuel supply system 100. Therefore, like parts will be identified with like numerals increased by 100, with it being understood that the description of the like parts of the fuel supply system 100 applies to the fuel supply system 200 unless otherwise noted.

The fuel supply system 200 supplies fuel from a fuel tank 202 to the combustor 30 of the engine 10. While illustrated as fluidly connected to the combustor 30, it is contemplated that the fuel supply system 200 can be fluidly connected to other components of the engine 10. The fuel supply system 200 includes at least the fuel tank 202, a fuel pump 204, a fuel metering valve (FMV) 206, and a bleed valve assembly 260.

A fuel supply line or fuel line 212 fluidly connects the fuel tank 202 to the combustor 30. The fuel pump 204 is fluidly coupled to the fuel line 212 to pump fuel from the fuel tank 202, through the fuel line 212, and to the combustor 30 of the engine 10. The FMV 206 is fluidly connected to the fuel line 212 downstream of the fuel pump 204 and upstream of the combustor 30. The FMV 206 can control the amount of fuel suppled to the combustor 30.

A bypass line 214 has a first end 216 that couples to the fuel line 212 downstream of the FMV 206 and upstream of the combustor 30. A second end 218 of the bypass line 214 can couple to an inlet 220 of the fuel pump 204, fluidly connecting the fuel line 212 downstream of an outlet 222 of the fuel pump 104 to the inlet 220 of the fuel pump 204. Alternatively, the second end 218 of the bypass line 214 can fluidly connect the fuel line 212 downstream of the fuel pump 204 to a stage of the fuel pump 204, a portion of the fuel line 212 upstream of the fuel pump 204, or the fuel tank 202.

The bleed valve assembly 260 can include a throttle valve (TV) 262 or a bypass pressure valve (BPV) 210. The TV 262 is fluidly coupled to the bypass line 214 between the first and second ends 216, 218. The TV 262 can control the flow of fuel from the fuel line 212 through the bypass line 214, which in turn effects the pressure difference across the FMV 206. A piston 264 can be coupled to or contained within the TV 262, where a first connecting conduit 266 can fluidly connecting a first side 268 of the piston 264 to the fuel line 212 upstream of the FMV 206. A second connecting conduit 270 fluidly connects a second side 272 of the piston 264 to the fuel line 212 downstream of the FMV 206.

The BPV 210 fluidly couples the bypass line 214 upstream of the TV 262 to the inlet 220 of the fuel pump 204. The BPV 210 can be used to adjust the pressure difference across the TV 262. Alternatively, the BPV 210 fluidly couples the bypass line 214 upstream of the TV 262 to a stage of the fuel pump 204, a portion of the fuel line 212 upstream of the fuel pump 204, or the fuel tank 202.

The fuel pump 204 can be in communication with the rotor 51. That is, the rotor 51 can mechanically or electrically drive or stroke the fuel pump 204. Alternatively, the fuel pump 204 can be in communication with the outer rotor/stator 63, when the outer rotor/stator 63 is configured to rotate. The fuel pump 204 can be, by way of non-limiting example, a positive displacement pump.

Optionally, the FMV 206 can include at least one pressure sensor, illustrated, by way of non-limiting example, as an upstream pressure sensor 230 and a downstream pressure sensor 232. The upstream and downstream pressure sensors 230, 232 can provide output signals indicative of the pressure drop across the FMV 206. The pressure drop across the FMV 106 can provide a fuel line pressure differential.

Similarly, the TV 262 can include at least one pressure sensor, illustrated, by way of non-limiting example, as a first pressure sensor 236 upstream of the TV 262 and a second pressure sensor 238 downstream of the TV 262. The first and second pressure sensors 236, 238 can provide output signals indicative of the pressure drop across the TV 262. The pressure drop across the TV 262 can provide a throttle pressure differential.

Optionally, the FMV 106, the TV 262, or the BPV 210 can include a controllable servo 234. The controllable servo 234 can be used to position or control the FMV 206, the TV 262 or the BPV 210.

It is contemplated that any one or more components of the fuel supply system 200 can be in communication with or partially controlled by at least one controller similar to the controller 140 illustrated in communication with the fuel supply system 100.

In operation, similar to the fuel supply system 100, the fuel pump 204 of the fuel supply system 200 pumps fuel from the fuel tank 202 at the first rate determined, at least in part, by the rotation of the rotor 51. The pumped fuel flows through a fuel line 212 to the FMV 206. The FMV 206 then allows fuel to flow to the combustor 30 of the engine 10 at the second rate. The second rate can be determined by a throttle setting communicated to the FMV 206 using the controller. The controller or the signal received by the FMV 206 can activate the controllable servo 234 to set the valve at the proper position to obtain the desired fuel line pressure differential. The fuel line pressure differential can be an absolute value or a value determined by a throttle setting. Absolute valve being within 5% of a predetermined number.

The fuel line pressure differential can be measured by the FMV 206 or the controller using the upstream and downstream pressure sensors 230, 232. Unused pumped fuel is removed, bleed, or otherwise redirected from the fuel line 212 to obtain the second flow rate and predetermined fuel line pressure differential. The unused pumped fuel can flow through the bypass line 214. In contrast the fuel supply system 100, the fuel supply system 200 includes the bleed valve assembly 260 fluidly coupled to the bypass line 214. The bleed valve assembly 260 pumps the unused fuel using the TV 262 back to the fuel pump 204, the fuel tank 202, or the fuel line 212 upstream of the fuel pump 204.

The BPV 210 can be used to maintain the predetermined throttle pressure differential across the TV 262. The predetermined bypass throttle differential of the fuel supply system 200 can be determined by the throttle setting, the fuel line pressure differential, or an absolute value. The first and second pressure sensors 236, 238 on the upstream and downstream sides of the TV 262 can provide a control signal that is communicated to the controllable servo 234 of the BPV 210. The BPV maintains the predetermined throttle pressure differential by allowing fuel to flow through the BPV 210 and return to the inlet 220 of the fuel pump 204, the fuel tank 202, a stage of the fuel pump 204, or the fuel line 212 upstream of the fuel pump 204.

Traditionally, when the FMV 206 fails, the TCMA cuts fuel or drastically reduces the flow of fuel to the combustor 30 by sending a signal to the fuel pump 204. However, the fuel supply system 200 has the ability to control the throttle pressure differential. The control of the throttle pressure differential allows the TCMA to modulate the fuel flow using the TV 262 and BPV 210 in a situation in which the FMV 206 is stuck open or otherwise malfunctioning. The fuel supply system 200 can then provide, like the fuel supply system 100, in a controlled manned, the required fuel for the engine 10 to obtain the fuel it needs to maintain proper function even in the event that the FMV 206 has malfunctioned. This can be accomplished in the fuel supply system 200 using the BPV 210 to control of the throttle pressure differential measured across the TV 262.

Figure 5:
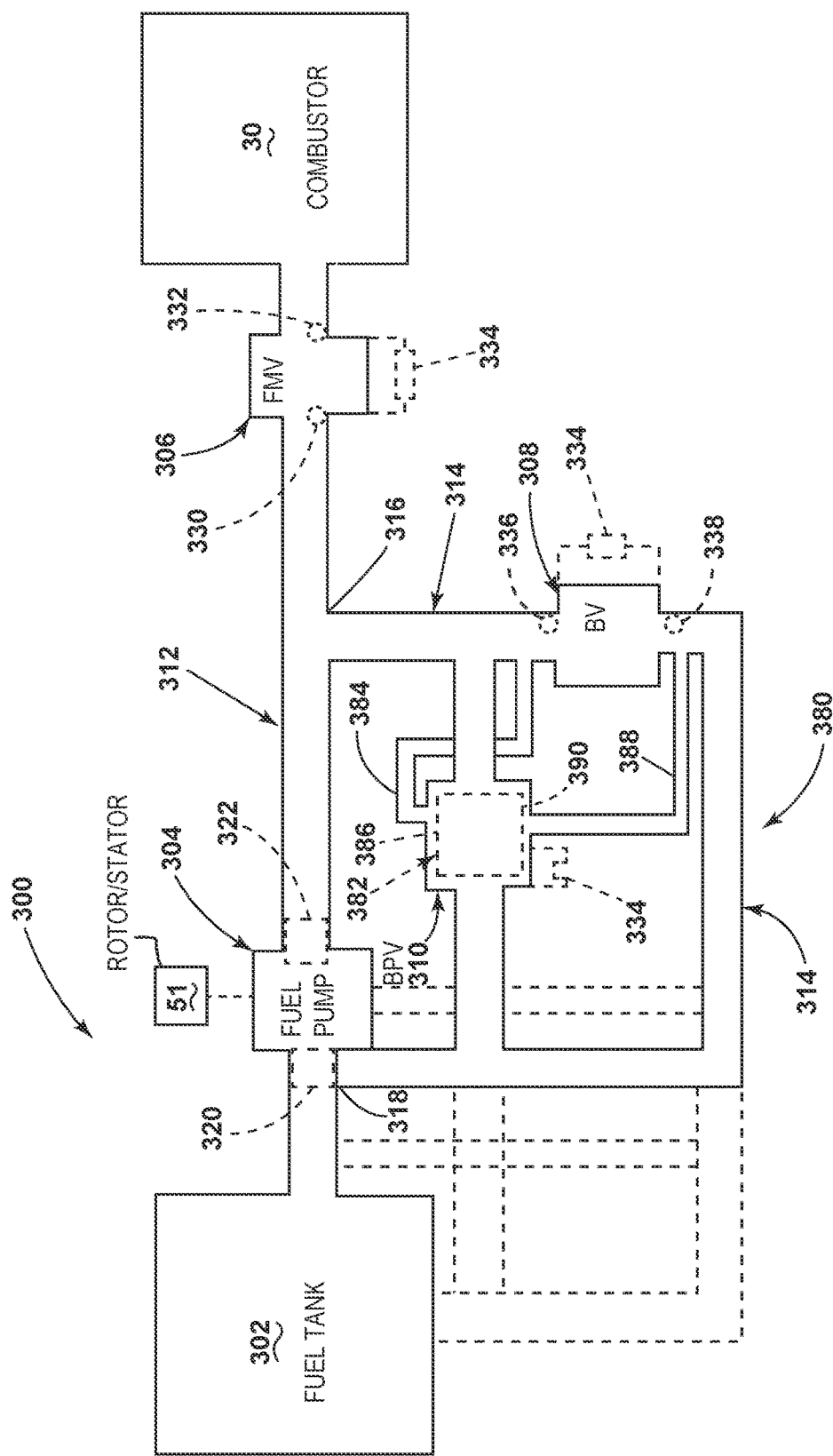
FIG. 5 is another variation of the fuel supply system of FIG. 2.

FIG. 5 illustrates a fuel supply system 300 that is substantially similar to the fuel supply system 100. Therefore, like parts will be identified with like numerals increased by 200, with it being understood that the description of the like parts of the fuel supply system 100 applies to the fuel supply system 300 unless otherwise noted.

The fuel supply system 300 can supply fuel to the combustor 30 of the engine 10. While illustrated as fluidly connected to the combustor 30, it is contemplated that the fuel supply system 300 can be fluidly connected to other components of the engine 10. The fuel supply system 300 includes at least a fuel tank 302, a fuel pump 304, a fuel metering valve (FMV) 306, and a bleed valve assembly 380.

A fuel supply line or fuel line 312 fluidly connects the fuel tank 302 to the combustor 30. The fuel pump 304 is fluidly coupled to the fuel line 312 to pump fuel from the fuel tank 302, through the fuel line 312, and to the combustor 30 of the engine 10. The FMV 306 is fluidly connected to the fuel line 312 downstream of the fuel pump 304 and upstream of the combustor 30. The FMV 306 can control the amount of fuel supplied to the combustor 30.

A bypass line 314 has a first end 316 that couples to the fuel line 112 downstream of the fuel pump 104 and upstream of the FMV 106. A second end 318 of the bypass line 314 can couple to an inlet 320 of the fuel pump 304, fluidly connecting the fuel line 312 downstream of an outlet 322 of the fuel pump 304 to the inlet 320 of the fuel pump 304. The bleed valve assembly 380 can include a BV 308 fluidly coupled to the bypass line 314 between the first and second ends 316, 318. The BV 308 can control the flow of fuel from the fuel line 312 through the bypass line 314, which in turn effects the pressure difference across the FMV 306. Alternatively, the second end 318 of the bypass line 314 can fluidly connect the fuel line 312 downstream of the fuel pump 304 to a stage of the fuel pump 304, a portion of the fuel line 312 upstream of the fuel pump 304, or the fuel tank 302.

The bleed valve assembly 380 can further include a BPV 310 that fluidly couples the bypass line 314 upstream of the FMV 306 to the inlet 320 of the fuel pump 304. A piston 382 can be coupled to or contained within the BPV 310, where a first connecting conduit 384 can fluidly connecting a first side 386 of the piston 382 to the bypass line 314 upstream of the BV 308. A second connecting conduit 388 fluidly connects a second side 390 of the piston 382 to the bypass line 314 downstream of the BV 308. The BPV 310 can be used to adjust the pressure difference across the BV 308. Alternatively, the BPV 310 that fluidly couples the bypass line 314 upstream of the BV 308 to a stage of the fuel pump 304, a portion of the fuel line 312 upstream of the fuel pump 304, or the fuel tank 302.

The fuel pump 304 can be in communication with the rotor 51. That is, the rotor 51 can mechanically or electrically drive or stroke the fuel pump 304. Alternatively, the fuel pump 304 can be in communication with the outer rotor/stator 63, when the outer rotor/stator 63 is configured to rotate. The fuel pump 304 can be, by way of non-limiting example, a positive displacement pump.

The FMV 306 can include at least one pressure sensor, illustrated, by way of non-limiting example, as an upstream pressure sensor 330 and a downstream pressure sensor 332.

The upstream and downstream pressure sensors 330, 332 can provide output signals indicative of the pressure drop across the FMV 306. The pressure drop across the FMV 306 can provide a fuel line pressure differential.

Similarly, the BV 308 can include at least one pressure sensor, illustrated, by way of non-limiting example, as a first pressure sensor 336 upstream of the BV 308 and a second pressure sensor 338 downstream of the BV 308. The first and second pressure sensors 336, 338 can provide output signals indicative of the pressure drop across the BV 308. The pressure drop across the BV 308 can provide a bypass pressure differential.

Optionally, the FMV 106, the BV 308, or the BPV 310 can include a controllable servo 134. The controllable servo 134 can be used to position or control the FMV 106, the BV 308, or the BPV 310.

It is contemplated that any one or more components of the fuel supply system 300 can be in communication with or partially controlled by at least one controller similar to the controller 140 illustrated in communication with the fuel supply system 100.

In operation, similar to the fuel supply system 100, the fuel pump 304 of the fuel supply system 300 pumps fuel from the fuel tank 302 at the first rate determined, at least in part, by the rotation of the rotor 51. The pumped fuel flows through a fuel line 312 to the FMV 306. The FMV 306 then allows fuel to flow to the combustor 30 of the engine 10 at the second rate. The second rate can be determined by a throttle setting communicated to the FMV 306 using the controller. The controller or the signal received by the FMV 306 can activate the servo 334 to set the valve at the proper position to obtain the desired fuel line pressure differential. The fuel line pressure differential can be an absolute value or a value determined by a throttle setting. Absolute valve being within 5% of a predetermined number.

The fuel line pressure differential can be measured by the FMV 306 or the controller using the upstream and downstream pressure sensors 330, 332. Unused pumped fuel is removed, bleed, or otherwise redirected from the fuel line 312 to obtain the second flow rate and predetermined fuel line pressure differential. The unused pumped fuel can flow through the bypass line 314. In contrast the fuel supply system 100, the fuel supply system 300 includes the bleed valve assembly 380 fluidly coupled to the bypass line 314. The bleed valve assembly 380 pumps the unused fuel via the BV 308 located downstream of the FMV 306, back to the fuel pump 304, the fuel tank 302, or the fuel line 312 upstream of the fuel pump 304.

The BPV 310 can be used to maintain the predetermined bypass pressure differential across the BV 308. Similarly to the fuel supply system 100, the predetermined bypass pressure differential of the fuel supply system 300 can be determined by the throttle setting, the fuel line pressure differential, or an absolute value. The first and second pressure sensors 336, 338 on the upstream and downstream sides of the BV 308 can provide a control signal that is communicated to the servo 334 of the BPV 310. The BPV 310 maintains the predetermined bypass pressure differential by allowing fuel to flow through the BPV 310 and return to the inlet 320 of the fuel pump 304, the fuel tank 302, a stage of the fuel pump 304, or the fuel line 312 upstream of the fuel pump 304.

Traditionally, when the FMV 306 fails, the TCMA cuts fuel or drastically reduces the flow of fuel to the combustor 30 by sending a signal to the fuel pump 304. However, the fuel supply system 300, like the fuel supply systems 100, has the ability to control the bypass pressure differential. The control of the bypass pressure differential allows the TCMA to modulate the fuel flow using the BV 308 and BPV 310 in a situation in which the FMV 306 is stuck open or otherwise malfunctioning. The fuel supply system 300, like the fuel supply system 100, can then provide, in a controlled manned, the required fuel for the engine 10 to obtain the fuel it needs to maintain proper function even in the event that the FMV 306 has malfunctioned. This can be accomplished in the fuel supply system 300 using the BPV 310 to control of the bypass pressure differential measured across the BV 308.

Benefits include the ability to control the fuel flow from a fuel tank to a turbine engine, even when the fuel metering valve is inoperable or stuck open. Traditionally, when the fuel metering valve is inoperable or stuck open, the fuel supply to the engine is cut or drastically reduced. With the bleed valve assembly, the fuel supply to the engine when the fuel metering valve is inoperable or stuck open does not need to be cut or reduced because the bleed valve assembly can control the flow of the fuel. This allows the turbine engine to continue to receive the fuel it needs, for example, to modulate and control thrust.

It should be appreciated that application of the disclosed design is not limited to turbine engines with fan and booster sections, but is applicable to turbojets and turboprop engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A fuel supply system for a turbine engine comprising a rotor, the fuel supply system comprising a fuel tank, a fuel line fluidly coupling the fuel tank to the turbine engine, a fuel pump fluidly coupled to the fuel line and driven by the rotor to pump fuel through the fuel line from the fuel tank to the turbine engine, a bypass line fluidly coupling the fuel line, downstream of the fuel pump, to at least one of the fuel pump, the fuel tank, or the fuel line, upstream of the fuel pump, a fuel metering valve fluidly coupled to the fuel line downstream of the fuel pump, a bypass valve fluidly coupling the fuel line to the bypass line upstream of the fuel metering valve, and a balancing pressure valve fluidly coupling the bypass line downstream of the bypass valve to at least one of the fuel pump, the fuel tank, the fuel line upstream of the fuel pump, or the bypass line upstream of the bypass valve, and maintains the pressure differential across the bypass valve at a predetermined bypass pressure differential.

2. The fuel supply system of any preceding clause wherein the predetermined bypass pressure differential is set according to a throttle setting for the turbine engine.

3. The fuel supply system of any preceding clause wherein the bypass valve maintains the pressure differential across the fuel metering valve at a predetermined fuel line pressure differential.

4. The fuel supply system of any preceding clause wherein the predetermined fuel line pressure differential or the predetermined bypass pressure differential is set to an absolute value.

5. The fuel supply system of any preceding clause wherein the predetermined bypass pressure differential is set according to a fuel line pressure difference across the fuel metering valve.

6. The fuel supply system of any preceding clause wherein at least one of the fuel metering valve, the bypass valve, or the balancing pressure valve comprises a controllable servo.

7. The fuel supply system of any preceding clause further comprising a pressure sensor having an output providing a control signal to the controllable servo.

8. The fuel supply system of any preceding clause wherein the pressure sensor outputs a signal indicative of the pressure drop across the bypass valve.

9. The fuel supply system of any preceding clause wherein the fuel pump is a positive displacement pump, a variable displacement pump, or a centrifugal fuel pump.

10. A fuel supply system for supplying fuel from a fuel tank to a combustion engine with a rotor, the fuel supply system comprising a fuel supply line supplying fuel from the fuel tank to the combustion engine, a fuel pump pumping fuel through the fuel supply line, a fuel metering valve controlling the flow of fuel through the fuel supply line to the combustion engine, a bleed valve assembly bleeding off fuel supplied to the engine based on the pressure difference across the fuel metering valve.

11. The fuel supply system of any preceding clause wherein the bleed valve assembly comprises a throttle valve fluidly coupled to the fuel supply line downstream of the fuel metering valve.

12. The fuel supply system of any preceding clause wherein the bleed valve assembly further comprises a balancing pressure valve fluidly coupling a bypass line downstream of the throttle valve to at least one of the fuel pump, the fuel tank, the fuel line upstream of the fuel pump, or the bypass line upstream of the throttle valve, and maintains the pressure differential across the throttle valve at a predetermined throttle pressure differential.

13. The fuel supply system of any preceding clause wherein the throttle valve comprises a piston having one side of the piston fluidly coupled to the fuel supply line downstream of the fuel metering valve and another side of the piston fluidly coupled to the fuel supply line upstream of the fuel metering valve.

14. The fuel supply system of any preceding clause wherein the bleed valve assembly comprises a bypass valve fluidly coupled to the fuel supply line upstream of the fuel metering valve.

15. The fuel supply system of any preceding clause wherein the bypass valve comprises a piston valve having one side fluidly coupled to the fuel supply line downstream of the fuel metering valve and another side fluidly coupled to the fuel supply line upstream of the fuel metering valve.

16. The fuel supply system of any preceding clause wherein the bleed valve assembly further comprises a balancing pressure valve fluidly coupling a bypass line downstream of the bypass valve to at least one of the fuel pump, the fuel tank, the fuel line upstream of the fuel pump, or the bypass line upstream of the bypass valve, and maintains the pressure differential across the bypass valve at a predetermined bypass pressure differential.

17. A method for controlling the supply of fuel from a fuel tank to a turbine engine having a rotor, the method comprising pumping fuel from the fuel tank to the turbine engine at a first rate that is a function of a rotational speed of the rotor, metering the pumped fuel being supplied to the engine at a second rate that is a function of a throttle setting of the turbine engine, after the metering, redirecting unused pumped fuel, and controlling the amount of redirected unused fuel based on predetermined pressure differential between the pumped fuel and the metered fuel.

18. The method of any preceding clause wherein the predetermined pressure differential is an operationally expected pressure differential for the throttle setting.

19. The method of any of any preceding clause wherein the redirecting comprises returning the fuel to the fuel tank, the fuel pump, or the fuel line upstream of the fuel pump.

20. The method of any preceding clause wherein the controlling is further based on a predetermined pressure differential across a bypass or a throttle valve.

What is claimed is:

1. A fuel supply system comprising:
   a fuel supply line to supply fuel to a combustion engine;
   a fuel metering valve coupled to the fuel supply line, the fuel metering valve to control a flow of fuel through the fuel supply line to the combustion engine;
   a throttle valve coupled to the fuel supply line downstream of the fuel metering valve, the throttle valve to bleed off fuel supplied to the combustion engine based on a pressure difference across the fuel metering valve, the throttle valve having a controllable position; and
   a controllable servo coupled to the throttle valve, the controllable servo to control the throttle valve to set the controllable position based on a sensor output received from a sensor positioned with respect to the fuel metering valve, the sensor output indicative of the pressure difference across the fuel metering valve, the controllable position of the throttle valve set by the controllable servo to modulate the flow of fuel.

2. The fuel supply system of claim 1, further including a bypass line, the bypass line to couple the throttle valve to the fuel supply line.

3. The fuel supply system of claim 2, further including a fuel pump and a bypass pressure valve, the bypass pressure valve to be fluidly coupled to the bypass line upstream of the throttle valve, and the bypass pressure valve to be fluidly coupled to an inlet of the fuel pump.

4. The fuel supply system of claim 1, wherein the pressure difference is a first pressure difference, and the fuel supply system further includes a bypass pressure valve, the bypass pressure valve to adjust a second pressure difference across the throttle valve.

5. The fuel supply system of claim 1, further including a piston with a first connecting conduit and a second connecting conduit, the first connecting conduit to fluidly connect a first side of the piston to the fuel supply line upstream of the fuel metering valve, and the second connecting conduit to fluidly connect a second side of the piston to the fuel supply line downstream of the fuel metering valve.

6. The fuel supply system of claim 1, wherein the pressure difference is a first pressure difference, and further including a pressure sensor with a pressure sensor output, the pressure sensor output to provide a signal to the controllable servo, the signal to be indicative of a second pressure difference across the throttle valve.

7. The fuel supply system of claim 1, further including a first pressure sensor and a second pressure sensor, the first pressure sensor to have a first output, the second pressure sensor to have a second output, and a difference between the first output and the second output to be indicative of a second pressure difference across the throttle valve, the sensor output based on the second pressure difference across the throttle valve.

8. The fuel supply system of claim 7, wherein the pressure difference is a throttle pressure differential.

9. The fuel supply system of claim 1, further including a fuel tank and a fuel pump, the fuel pump coupled to the fuel supply line downstream of the fuel tank, the fuel pump to pump fuel through the fuel supply line.

10. The fuel supply system of claim 1, wherein the controllable servo is to control a position associated with the throttle valve.

11. A fuel supply system comprising:
a fuel pump;
a combustor;
a fuel metering valve coupled to the fuel pump and the combustor through a fuel supply line;
a throttle valve coupled to the fuel supply line downstream of the fuel metering valve, the throttle valve having a controllable position to modulate a flow of fuel by bleeding off a portion of fuel supplied to the combustor;
a pressure sensor coupled to the throttle valve; and
a controllable servo coupled to the throttle valve and the pressure sensor, the controllable servo to set the controllable position of the throttle valve based on a pressure difference across the fuel metering valve as sensed by a second pressure sensor.

12. The fuel supply system of claim 11, further including a bypass pressure valve coupled to a first inlet of the throttle valve, an outlet of the throttle valve, and a second inlet of the fuel pump.

13. The fuel supply system of claim 11, wherein the throttle valve includes a piston.

14. The fuel supply system of claim 13, wherein the fuel metering valve has a first inlet, a second inlet, a first outlet, and a second outlet, the first inlet coupled to the fuel pump, the second inlet coupled to a first side of the piston, the first outlet coupled to the combustor, and the second outlet coupled to a second side of the piston.

15. An engine comprising:
a fuel tank;
a fuel pump coupled to the fuel tank;
a fuel metering valve coupled to the fuel pump;
a combustor coupled to the fuel metering valve;
a throttle valve coupled to the fuel metering valve and the combustor, a position of the throttle valve controllable by a controllable servo to modulate a flow of fuel by bleeding off a portion of fuel supplied to the combustor;
a pressure sensor coupled to the throttle valve; and
the controllable servo coupled to the throttle valve and the pressure sensor based on a pressure difference across the fuel metering valve as sensed by a second pressure sensor.

16. The engine of claim 15, further including a rotor coupled to the fuel pump.

17. The engine of claim 15, further including a bypass pressure valve coupled to the fuel metering valve, the throttle valve, and the fuel pump.

18. The engine of claim 15, further including a fuel supply line and a bypass line, the throttle valve coupled to the fuel supply line downstream of the fuel metering valve through the bypass line.

19. The engine of claim 15, further including a fuel supply line and a connecting conduit, the throttle valve coupled to the fuel supply line upstream of the fuel metering valve through the connecting conduit.

\* \* \* \* \*